United States Patent Office 3,701,781
Patented Oct. 31, 1972

3,701,781
ALPHA-OXIMINO KETONE ANTISKINNING
AGENTS
Christian H. Stapfer, Newtown, Pa., assignor to Cincinnati Milacron Chemicals Inc., Reading, Ohio
No Drawing. Filed May 14, 1971, Ser. No. 143,640
Int. Cl. C09d 3/64
U.S. Cl. 260—22 A                                                6 Claims

ABSTRACT OF THE DISCLOSURE

Compounds corresponding to the formulae:

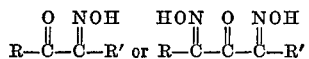

wherein R and R' are straight chain alkyls having 1 to 10 carbon atoms, which may have one methyl branch are superior antiskinning agents for phenol-modified unsaturated polyester resins.

---

This invention relates to antiskinning agents for use with oxidizable resins and, more particularly, to the use of certain oximo ketones as antiskinning agents for inhibiting the formation of skin, on alkyd resin compositions and especially phenol-modified alkyd resins. As applied to resins herein, the term "phenol-modified" is intended to include all resins containing phenolic type cross-linking materials.

Many types of air-hardenable coating compositions, such as paints, varnishes, enamels, and lacquers, when exposed in bulk to air either in open or closed containers, tend to develop tough, rubber-like skins over or near exposed surfaces or to become thick or livery and no amount of stirring will serve to restore their normal homogeneous character. It is obvious that this capacity for becoming heterogeneous hereinafter referred to as "skinning" is not merely the result of gravitational separation of constituents, such as results when a heavy pigment settles in a lighter vehicle, but is chemical in nature. Skinning is generally attributed to oxidation or to polymerization in the presence of oxygen of certain constituents, such as drying oils or resins (vehicular constituents of paints and enamels), which give to the composition their ability of "air-harden" and thus to form durable coatings. Since this property of air-hardening is necessary for the normal uses of such compositions, it is apparent that efforts to eliminate skinning and related phenomena must at the same time avoid an objectionable loss of the air-hardening properties of the composition in film form.

"Antiskinning" agents are materials which inhibit the formation of such films without materially increasing the drying time of the product. One type of antiskinning agent used heretofore, for example, has consisted of solvents which apparently inhibit the formation of a skin through their ability to act as dispersants for polymers. Recently, the prevention of skin formation using certain antioxidants, e.g. methylethylketoxime; phenols such as octylphenol and 2-6-di-tert.-butyl-4-methylphenol; and oximes, such as propionaldoxime and butyraldoxime, has been investigated. While a number of diverse skinning agents have been used for alkyd resins, they have not been effective for phenol-modified alkyds. Butyraldoxime is more effective than most skinning agents for phenol-modified alkyd resins but is very expensive.

According to the present invention, it has been found that certain oximo ketones are effective as an antiskinning agent for resins which dry by oxidation, e.g. alkyd resins, especially phenol-modified alkyd resins and compositions such as varnishes, paints, etc., containing the same.

Oximino ketones suitable for practicing the present invention correspond to the formulae:

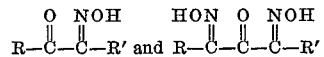

wherein R and R' are straight chain alkyls having 1 to 10 carbon atoms, preferably 1 to 4 carbon atoms, or a $C_{1-10}$ alkyl having a single methyl side group. These oximino ketones have been discovered to overcome the prior art skinning problem with respect to the phenol-modified alkyd resins. The antiskinning agents of the present invention are even more effective than butyraldoxime. In the case of 3-oximino-2-butanone, which can be prepared by direct oximation of methylethyl ketone with nitrosyl chloride, better results are obtained at substantially less cost than heretofore possible.

Some specific examples of oximino ketones suitable for practicing the present invention in addition to 3-oximino-2-butanone are 3-oximino-2-pentanone; 5-oximino-4-octanone; 6-methyl-4-oximino-3-heptanone; 6-oximino-5-decanone; 12-oximino-11-docosanone; 2,4-dioximino-3-pentanone; 4,6-dioximino-5-monanone and 2,8-dimethyl-5,7-dioximino-6-nonanone. The oximino ketones suitable for practicing the present invention can be prepared by the conventional oximination of ketones having at least one methylene group in an alpha position to the carbonyl group.

The antiskinning agents of the present invention effectively protect oxidizable polyester resins, e.g. alkyd resins as a class against skinning. Alkyd resins are complex polyesters produced by the esterification of a polyhydric alcohol with a polybasic organic acid. Any desired polyfunctional alcohol aminomethane, glycerol, ethylene glycol, polyglycerol, pentaerythritol, mannitol, sorbitol, propylene glycol, etc. The polybasic organic acid can, for example, be a dicarboxylic acid such as for example, phthalic, maleic or fumaric acids or a tribasic acid such as trimellitic acid.

The most common examples of alkyd resins are the commercially available glycerol-phthalic anhydride poly esters that have been modified with an unsaturated fatty acid composition (or its glyceride) such as linseed oil, soybean oil, or the like. The trihydric nature of the glycerol in such a composition provides the necessary cross-linking to form a three dimensional polymer of the desired type. An analogous type of cross-linking can also be achieved when a combination of a tribasic acid and a glycol is used. In the latter case, the desired three dimensional cross-linking of the polyester results from the polybasicity of the acid. In these compositions, the chemically combined fatty acids act as a drying agent for the liquid polyester product.

Alkyd resin compositions for paint and coating use are frequently modified with phenols to provide improved mechanical properties such as film rigidity, which participate in the curing reaction and cross-link the alkyd resin chains. The particulars of modifying alkyd resins with phenols is well known to those skilled in the art of alkyd resin paints and coating. Some examples of phenols comonly used include phenol; para alkyl phenols such as p-cresol and p-nonyl phenol and phenolic resins, such as those having a formula corresponding to

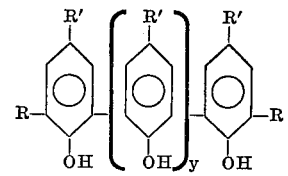

wherein R' is a lower alkyl and R is a terminal group such as tertiary butyl or methylol. One example of suitable phenolic resins are the Amberol® manufactured by Rohm and Haas Company.

The oximino ketone antiskinning agents of the present invention are mixed with alkyd resin formulations by conventional procedures in effective antiskinning amounts generally of about 0.001 to 5 weight percent. To prevent effectively skinning of phenol modified resin compositions, the amount of oximino ketone necessary is usually about 0.01 to 5 weight percent and 0.05 to 3 weight percent is preferred.

The following examples are presented to illustrate specific embodiments of the present invention.

EXAMPLE I

A coating formulation was prepared containing 2000 g. of a phenol-modified alkyd resin containing 27% phthalic anhydride and 18% linseed oil, 240 g. xylene as vehicle, 14 g. of a 6% cobalt naphthenate drier, and 28 g. of a zirconium auxiliary drier.

A sample of the coating formulation weighing 100 g. was mixed with 0.2 g. of a 50% solution of 3-oximino-2-pentanone in methylethyl ketone. The sample was stored in a bottle having an air filled head space of about 10 cc. at room temperature exposed to daylight. At regular intervals of 24 hours the bottle was inverted. Skinning was determined by the presence of a thin wrinkled film at the liquid-air interface, which tore as the bottle was tipped. A control tested as above but containing 0.2 g. of methylethyl ketone instead of the antiskinning agent solution had a skin on the third day (72 hrs.), while the sample containing 3-oximino-2-pentanone passed the 40 day test without skinning.

The procedure was repeated using a sample containing 0.05 weight percent 3-oximino-2-pentanone and the sample passed the twelfth day test without skinning.

EXAMPLE II

The procedure of Example I was repeated using 3-oximino-2-butanone instead of 3-oximino-2-pentanone. The samples containing 0.2 g. and 0.1 g. of the 50% antiskinning solution passed 12 days of testing while the control failed the first 24 hour test.

EXAMPLE III

A coating formulation was prepared by blending 2000 g. of a different phenol-modified alkyd resin containing 27% phthalic anhydride, 28% linseed oil and rosin, 250 g. of high solvency naphtha and .84 g. cobalt octoate as a drier.

Two samples of the coating formulation, each weighing 100 g. were mixed with 0.2 and 0.1 g. respectively of a 50% solution of 2,4-dioximino-3-pentanone in methylethyl ketone. The samples were bottled and tested against a control according to the procedure of Example I.

The samples containing the antiskinning agent passed the 12 day test while the control failed the first 24 hour test.

EXAMPLE IV

To demonstrate the unexpected superiority of the antiskinning agents of the present invention, a comparison test was made against prior art antiskinning agents. Following the procedure of Example I and using the coating formulation prepared therein, 100 g. samples containing 0.05 weight percent 3-oximino-2-pentanone, butyraldoxime, 2-oximino pentane and propionaldoxime respectively. A control containing no antiskinning agent failed the 24 hour test. The sample containing 0.05% 3-oximino-2-pentanone passed 12 days of tests. The prior art compounds, butyraldoxime, 2-oximino pentane and propionaldoxime failed the 6 days, 24 hours, and 2 days test respectively.

What is claimed is:

1. In an oxidizable, phenol-modified polyester resin coating composition, the improvement comprising an effective antiskinning amount of a compound corresponding to a formula selected from the group consisting of

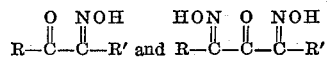

wherein R and R' are selected from the group consisting of straight chain alkyl having 1 to 10 carbon atoms and alkyl of up to 10 carbon atoms having a single methyl branch.

2. The improvement of claim 1 wherein R and R' have 1 to 4 carbon atoms.

3. The improvement of claim 1 wherein the compound is selected from the group consisting of 3-oximino-2-butanone, 3-oximino-2-pentanone, 5-oximino-4-octanone, 6-methyl-4-oximino-3-heptanone, 6 - oximino-5-dicanone, 12-oximino-11-docosanone, 2,4 - dioximino-3-pentanone, 4,6-dioximino-5-monanone and 2,8-dimethyl-5,7-dioximino 6-nonanone.

4. The improvement of claim 1 wherein the compound is 3-oximino-2-pentanone and is present in an amount between 0.05 and 3 weight percent based on said resin.

5. The improvement of claim 1 wherein the compound is 3-oximino-2-butanone and is present in an amount between 0.05 and 3 weight percent based on said resin.

6. The improvement of claim 1 wherein the compound is 2,4-dioximino-3-pentanone and is present in an amount between 0.05 and 3 weight percent based on said resin.

References Cited

UNITED STATES PATENTS

| 2,877,130 | 3/1959 | Caron et al. | 260—22 |
| 3,346,523 | 10/1967 | Wiese | 260—19 |
| 3,380,836 | 4/1968 | Robinson | 260—22 |
| 3,547,846 | 12/1970 | Coulter | 260—21 |
| 3,562,194 | 2/1971 | Offermann et al. | 260—22 |

OTHER REFERENCES

Chemical Abstracts, vol. 66, No. 18, May 1, 1967, p. 77000v.

Chemical Abstracts, vol. 70, No. 8, Feb. 24, 1969, p. 30094w.

DONALD E. CZAJA, Primary Examiner

R. W. GRIFFIN, Assistant Examiner

U.S. Cl. X.R.

117—161 K; 260—32.4, 32.8 R, 45.9 R, 75 N